(12) United States Patent
Kinrot et al.

(10) Patent No.: US 7,907,791 B2
(45) Date of Patent: Mar. 15, 2011

(54) PROCESSING OF MOSAIC IMAGES

(75) Inventors: Uri Kinrot, Hod Hasharon (IL); Alex Alon, Binyamina (IL)

(73) Assignee: Tessera International, Inc., San Jose, CA (US)

( * ) Notice: Subject to any disclaimer, the term of this patent is extended or adjusted under 35 U.S.C. 154(b) by 806 days.

(21) Appl. No.: 11/715,862

(22) Filed: Mar. 7, 2007

(65) Prior Publication Data

US 2008/0095466 A1    Apr. 24, 2008

Related U.S. Application Data

(60) Provisional application No. 60/861,386, filed on Nov. 27, 2006.

(51) Int. Cl.
*G06K 9/36* (2006.01)
(52) U.S. Cl. .......................... 382/276; 382/284
(58) Field of Classification Search .............. 382/254, 382/263, 276, 280, 284, 199
See application file for complete search history.

(56) References Cited

U.S. PATENT DOCUMENTS

| | | | |
|---|---|---|---|
| 3,971,065 A | 7/1976 | Bayer | |
| 4,697,208 A | 9/1987 | Eino et al. | |
| 6,154,574 A | 11/2000 | Paik et al. | |
| 6,240,219 B1 | 5/2001 | Gregory | |
| 6,704,440 B1 | 3/2004 | Kump | |
| 6,757,012 B1 | 6/2004 | Hubina et al. | |
| 6,900,838 B1 | 5/2005 | Fujimura et al. | |
| 2002/0008715 A1* | 1/2002 | Sorek et al. | 345/698 |
| 2002/0012055 A1 | 1/2002 | Koshiba et al. | |
| 2003/0048368 A1 | 3/2003 | Bosco et al. | |
| 2003/0086606 A1 | 5/2003 | Hunter et al. | |
| 2004/0028271 A1 | 2/2004 | Pollard et al. | |
| 2004/0096125 A1 | 5/2004 | Alderson et al. | |
| 2005/0200700 A1 | 9/2005 | Schofield et al. | |
| 2005/0276475 A1 | 12/2005 | Sawada | |
| 2006/0268134 A1* | 11/2006 | Chen et al. | 348/241 |
| 2007/0236573 A1 | 10/2007 | Alon et al. | |

FOREIGN PATENT DOCUMENTS

EP          0814605          12/1997

(Continued)

OTHER PUBLICATIONS

U.S. Appl. No. 60/861,386.

(Continued)

*Primary Examiner* — Yon Couso
(74) *Attorney, Agent, or Firm* — Hickman Palermo Truong & Becker LLP

(57) ABSTRACT

Imaging apparatus includes a mosaic image sensor, which is configured to generate a stream of input pixel values belonging to a plurality of input sub-images, each sub-image responsive to light of a different, respective color that is incident on the mosaic image sensor. An image restoration engine (IRE) is coupled to receive and digitally filter the input pixel values in each of the input sub-images so as to generate a corresponding plurality of enhanced output sub-images, and to extract auxiliary information from the input sub-images prior to digitally filtering the input pixel values. An image signal processor (ISP) is coupled to receive the plurality of the output sub-images and the auxiliary information from the IRE, and to combine the output sub-images in order to generate a color video output image while enhancing the color video output image using the auxiliary information.

47 Claims, 3 Drawing Sheets

FOREIGN PATENT DOCUMENTS

WO          2004/063989          7/2004

OTHER PUBLICATIONS

U.S. Appl. No. 60/735,520.

Rebiai, et al. "Image Distortion from Zoom Lenses: Modeling and Digital Correction." IBC—International Broadcasting Convention, IEEE, Jul. 1992 (1992).

Dowski E R, et al., "Wavefront coding: A modern method of achieving high performance and/or low cost imaging systems", Proceedings of the SPIE, Bellingham, VA, US, vol. 3779, Jul. 1999, pp. 137-145.

Alter-Gartenberg R: "Information metric as a design tool for optoelectronic imaging systems", Applied Optics, OSA, Optical Society of America, Washington DC, US, vol. 39, No. 11, Apr. 2000, pp. 1743-1760.

International Search Report, application No. PCT/IL07/01391 dated Jan. 5, 2009 (1 pg).

Iper, application No. PCT/IL2007/001391 dated Jun. 3, 2009 (7 pgs) including Written Opinion of ISA.

Current claims in application No. PCT/IL2007/001391, consisting of 7 pages (pp. 17-23) filed Nov. 13, 2007.

* cited by examiner

PROCESSING OF MOSAIC IMAGES

CROSS-REFERENCE TO RELATED APPLICATION

This application claims the benefit of U.S. Provisional Patent Application 60/861,386, filed Nov. 27, 2006, entitled "Improved Integration of Image Restoration Engine and ISP," which is incorporated herein by reference.

FIELD OF THE INVENTION

The present invention relates generally to digital imaging, and specifically to methods and devices for enhancing image quality in digital cameras.

BACKGROUND OF THE INVENTION

Low-cost color video cameras typically use a single solid-state image sensor with a multi-colored mosaic filter overlay. A mosaic filter is a mask of miniature color filter elements in which a filter element is positioned in front of each detector element of the image sensor. For example, U.S. Pat. No. 4,697,208, whose disclosure is incorporated herein by reference, describes a color image pickup device that has a solid-state image sensing element and a complementary color type mosaic filter. Any sort of image sensor with a color mosaic filter, regardless of the choice and arrangement of the colors in the mosaic, is referred to hereinbelow as a "mosaic image sensor."

The filter elements in the mosaic filter generally alternate between the primary RGB colors, or between the complementary colors cyan, magenta and yellow. One common type of color mosaic filter is called a "Bayer sensor" or "Bayer mosaic," which has the following general form (in which letters represent colors—R denotes red, G denotes green and B denotes blue):

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

The different color filters have respective passbands, which may overlap. The Bayer mosaic is described in U.S. Pat. No. 3,971,065, whose disclosure is incorporated herein by reference.

Processing the image produced by a mosaic image sensor typically involves reconstructing the full color image by extracting three color signals (red, green and blue) from the sensor output. An image signal processor (ISP) processes the image sensor output in order to compute luminance (Y) and chrominance (C) values for each pixel of the output image. The ISP then outputs these values (or the corresponding R, G and B color values) in a standard video format.

SUMMARY OF THE INVENTION

Embodiments of the present invention that are described hereinbelow provide methods and devices for processing and enhancement of electronic images, and particularly images that are produced by a mosaic image sensor. The sensor outputs a stream of pixel values belonging to a plurality of input sub-images, each of which is due to light of a different, respective color that is incident on the mosaic image sensor. In some embodiments, an image restoration engine (IRE) filters the pixel values in each of the input sub-images so as to generate corresponding output sub-images with enhanced quality, such as with reduced blur. An image signal processor (ISP) then combines the output sub-images so as to generate a color video output image. The IRE and ISP may be separate units, or they may alternatively be combined in a single integrated circuit.

In some embodiments, the IRE and ISP exchange auxiliary information in order to enhance the output image quality. In some embodiments, the IRE extracts information from the individual sub-images and feeds the information forward to the ISP for use in generating and/or processing of the combined image. In other embodiments, the ISP generates auxiliary information based on the combined image and feeds it back to the IRE for use in processing the individual sub-images. The auxiliary information that is fed back or fed forward may simply comprise pixel values, or it may alternatively comprise processed image parameters, such as edge, color or brightness information.

Although the embodiments described hereinbelow refer to a particular processing architecture, based on IRE and ISP functions, the principles of the present invention, whereby features of mosaic sub-images, such as edge characteristics, are used in controlling generation and/or processing of post-mosaic combined images, and vice versa, may similarly be applied in architectures of other types.

There is therefore provided, in accordance with an embodiment of the present invention, imaging apparatus, including:

a mosaic image sensor, which is configured to generate a stream of input pixel values belonging to a plurality of input sub-images, each sub-image responsive to light of a different, respective color that is incident on the mosaic image sensor;

an image restoration engine (IRE), which is coupled to receive and digitally filter the input pixel values in each of the input sub-images so as to generate a corresponding plurality of enhanced output sub-images, and to extract auxiliary information from the input sub-images prior to digitally filtering the input pixel values; and an image signal processor (ISP), which is coupled to receive the plurality of the output sub-images and the auxiliary information from the IRE, and to combine the output sub-images in order to generate a color video output image while enhancing the color video output image using the auxiliary information.

In a disclosed embodiment, the IRE includes a deconvolution filter for reducing a blur of the input sub-images, and the mosaic image sensor includes an array of filters that are arranged in a Bayer mosaic pattern.

In some embodiments, the auxiliary information includes edge information. The edge information may include an edge mask identifying edge regions in the input sub-images. Additionally or alternatively, the edge information includes at least one edge characteristic that is determined respectively for each of a plurality of pixels in the input sub-images, wherein the at least one edge characteristic is selected from a group of characteristics consisting of an edge magnitude and an edge direction. Further additionally or alternatively, the ISP is configured to enhance the color video output image by performing at least one image enhancement operation responsively to the edge information, wherein the at least one image enhancement operation is selected from a group of operations consisting of noise suppression and edge enhancement.

In some embodiments, the auxiliary information includes at least one item of information selected from a group of items consisting of an identification of bad pixels and a local noise parameter. Additionally or alternatively, the auxiliary information includes at least one type of pixel value data selected from a group of types of pixel value data consisting of the input pixel values, and differences between the input pixel values and output pixel values of the output sub-images.

In a disclosed embodiment, the output sub-images include output pixel values, and the IRE is configured to convey the auxiliary information to the ISP by adding one or more auxiliary bits to the output pixel values. The IRE may be configured to convey the output pixel values and the one or more auxiliary bits to the ISP via a serial data bus or via a parallel data bus.

Optionally, the ISP is configured to perform one or more image processing and control operations selected from the group of operations consisting of demosaic processing, white balancing, and auto-exposure control, and to apply the auxiliary information in performing at least one of the one or more image processing and control operations.

There is also provided, in accordance with an embodiment of the present invention, imaging apparatus, including:

a mosaic image sensor, which is configured to generate a stream of input pixel values belonging to a plurality of input sub-images, each sub-image responsive to light of a different, respective color that is incident on the mosaic image sensor;

an image restoration engine (IRE), which is coupled to receive and digitally filter the input pixel values in each of the input sub-images using filter parameters determined responsively to auxiliary information, so as to generate a corresponding plurality of enhanced output sub-images; and an image signal processor (ISP), which is coupled to receive and combine the plurality of the output sub-images in order to generate a color video output image, while generating, responsively to the combined sub-images, the auxiliary information for input to the image restoration engine.

In a disclosed embodiment, the IRE is configured to detect edges in the input sub-images, and the auxiliary information includes an edge detection threshold for use in detecting the edges in the input sub-images. Additionally or alternatively, the auxiliary information includes an indication of a filter kernel to be applied by the IRE in digitally filtering the input pixel values.

There is additionally provided, in accordance with an embodiment of the present invention, imaging apparatus, including:

a mosaic image sensor, which is configured to generate a stream of input pixel values belonging to a plurality of sub-images, each sub-image responsive to light of a different, respective color that is incident on the mosaic image sensor;

an edge detector, which is coupled to extract edge information from one or more of the sub-images; and an image signal processor (ISP), which is coupled to receive and combine the plurality of the sub-images in order to generate a color video output image, and to enhance the color video output image using the edge information.

In a disclosed embodiment, the edge detector is configured to extract the edge information at each pixel among a plurality of pixels in at least one sub-image by processing the input pixel values of a first group of the pixels that are horizontally aligned with the pixel and of a second group of the pixels that are vertically aligned with the pixel.

There is further provided, in accordance with an embodiment of the present invention, a method for imaging, including:

receiving from a mosaic image sensor a stream of input pixel values belonging to a plurality of input sub-images, each sub-image responsive to light of a different, respective color that is incident on the mosaic image sensor;

digitally filtering the input pixel values in each of the input sub-images so as to generate a corresponding plurality of enhanced output sub-images;

extracting auxiliary information from the input sub-images prior to digitally filtering the input pixel values; and combining the output sub-images in order to generate a color video output image, while enhancing the color video output image using the auxiliary information.

There is moreover provided, in accordance with an embodiment of the present invention, a method for imaging, including:

receiving from a mosaic image sensor a stream of input pixel values belonging to a plurality of input sub-images, each sub-image responsive to light of a different, respective color that is incident on the mosaic image sensor;

digitally filtering the input pixel values in each of the input sub-images using filter parameters determined responsively to auxiliary information, so as to generate a corresponding plurality of enhanced output sub-images;

combining the output sub-images in order to generate a color video output image while enhancing the color video output image; and generating the auxiliary information responsively to the combined sub-images.

There is furthermore provided, in accordance with an embodiment of the present invention, a method for imaging, including:

receiving from a mosaic image sensor a stream of input pixel values belonging to a plurality of sub-images, each sub-image responsive to light of a different, respective color that is incident on the mosaic image sensor;

extracting edge information from one or more of the sub-images;

combining the output sub-images in order to generate a color video output image; and enhancing the color video output image using the edge information.

There is also provided, in accordance with an embodiment of the present invention, a computer software product, including a computer-readable medium in which program instructions are stored, which instructions, when read by the computer, cause the computer to receive, from a mosaic image sensor, a stream of input pixel values belonging to a plurality of sub-images, each sub-image responsive to light of a different, respective color that is incident on the mosaic image sensor, to extract edge information from one or more of the sub-images, to combine the plurality of the sub-images in order to generate a color video output image, and to enhance the color video output image using the edge information.

There is additionally provided, in accordance with an embodiment of the present invention, a computer software product, including a computer-readable medium in which program instructions are stored, which instructions, when read by the computer, cause the computer to receive, from a mosaic image sensor, a stream of input pixel values belonging to a plurality of sub-images, each sub-image responsive to light of a different, respective color that is incident on the mosaic image sensor, to digitally filter the input pixel values in each of the input sub-images so as to generate a corresponding plurality of enhanced output sub-images, and to extract auxiliary information from the input sub-images prior to digitally filtering the input pixel values, and to combine the output sub-images in order to generate a color video output image while enhancing the color video output image using the auxiliary information.

The present invention will be more fully understood from the following detailed description of the embodiments thereof, taken together with the drawings in which:

DETAILED DESCRIPTION OF EMBODIMENTS

Figure 1:
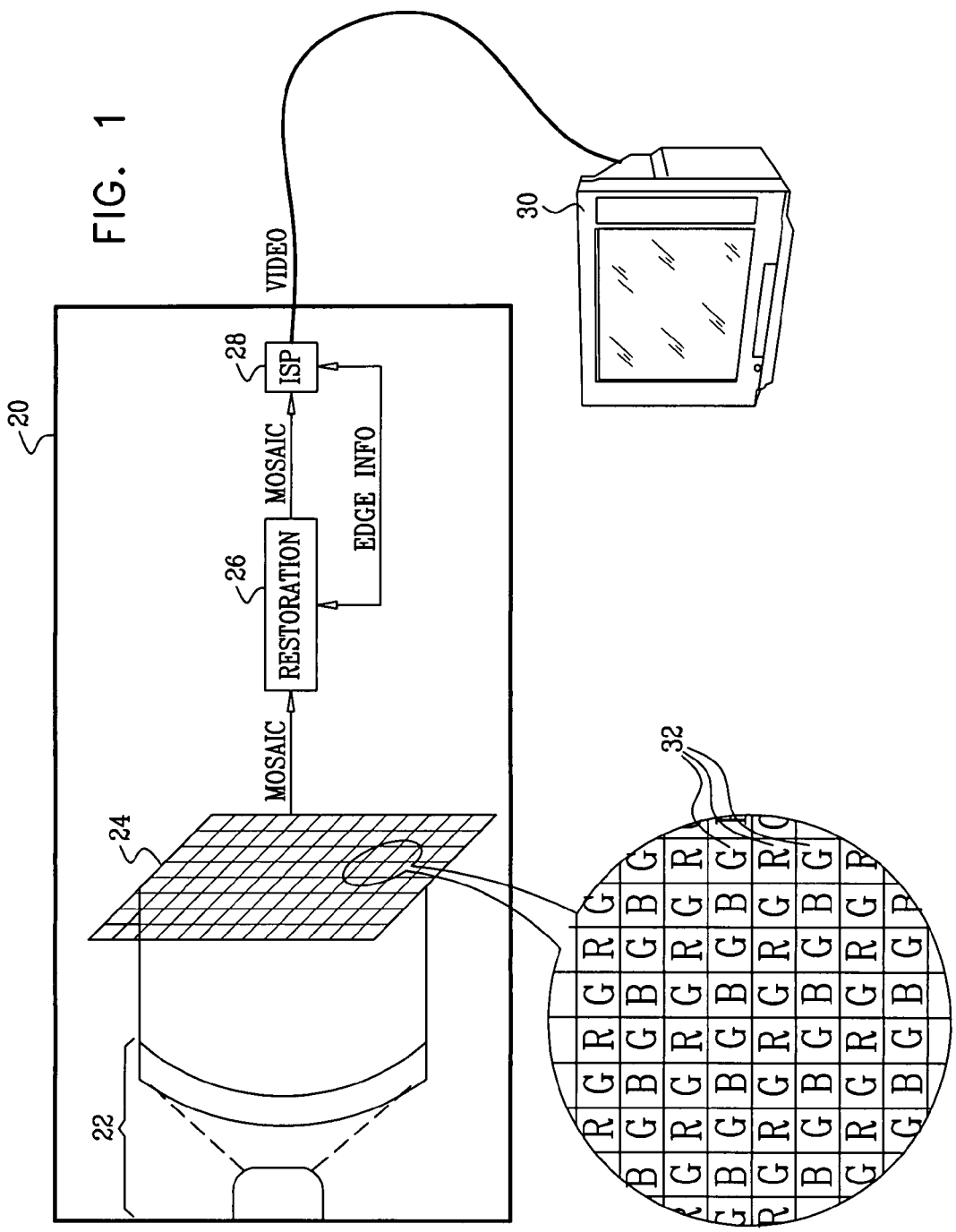
FIG. 1 is a block diagram that schematically illustrates an electronic imaging camera, in accordance with an embodiment of the present invention.

FIG. 1 is a block diagram that schematically illustrates an electronic imaging camera 20, in accordance with an embodiment of the present invention. This specific, simplified camera design is shown here by way of example, in order to clarify and concretize the principles of the present invention. These principles, however, are not limited to this design, but may rather be applied in enhancing output image quality in imaging systems of other types in which a sensor produces multiple sub-images of different colors, which are then combined to produce an enhanced color output image.

In camera 20, objective optics 22 focus light from a scene onto a mosaic image sensor 24. Any suitable type of image sensor, such as a CCD or CMOS image sensor, may be used in the camera. In this example, as well as in the description that follows, the sensor is assumed to have a Bayer-type mosaic filter, so that each pixel 32 in the image signal output by the sensor is responsive to either red, green or blue light. Thus, the mosaic sensor output can be seen as comprising red, green and blue sub-images, made up of the pixel values of the corresponding sensor elements. The pixel values belonging to the different sub-images are typically interleaved in the output signal according to the order of the color elements in the mosaic filter, i.e., the sensor outputs one row of RGR GRG . . . (alternating red and green filters), followed by a succeeding row of GBGBGB . . . (alternating green and blue), and so forth in alternating lines. Alternatively, the methods and circuits described hereinbelow may be used, mutatis mutandis, with other types of mosaic sensor patterns.

The stream of pixel values output by image sensor 24 is received and processed by an image restoration engine (IRE) 26. This component of camera 20 is described in detail hereinbelow with reference to FIG. 2. The pixel values are digitized prior to processing by IRE 26 by an analog/digital converter (not shown in the figures), which may be integrated with either sensor 24 or IRE 26 or may be a separate component. In any case, IRE 26 processes the red, green and blue input sub-images that are produced by sensor 24 in order to reduce the image blur, as described hereinbelow. IRE 26 then outputs red, green and blue sub-images with reduced blur.

Typically, IRE 26 outputs the sub-images in the same format in which it received the sub-images from sensor 24. For example, IRE 26 may interleave the pixel values in the output sub-images to generate a single output stream, in which the pixel values have the same interleaving as the input pixel values from sensor 24. Alternatively, IRE 26 may be configured to demultiplex and output each sub-image as a separate data block or data stream.

An ISP 28 receives the deblurred red, green and blue output sub-images from IRE 26 and combines the sub-images to generate a color video output image (or image sequence) in a standard video format. This output image may be displayed on a video screen 30, as well as transmitted over a communication link and/or stored in a memory. In embodiments in which IRE 26 outputs the sub-images in the same format in which it received the sub-images from sensor 24, ISP 28 may be used interchangeably to process either the output of IRE 26 or to process the output of sensor 24 directly. This feature of IRE 26 is advantageous, inter alia, in that it permits the IRE to be used with an existing sensor and ISP without modification to either the sensor or the ISP. It also permits the restoration function of IRE 26 to be switched on and off simply by activating or deactivating a bypass link (not shown) between the sensor and the ISP or by appropriately setting the processing parameters of the IRE to give an output identical to the input.

The color video output image generated by ISP 28 typically contains both luminance and color information for each pixel in the image. This information may be encoded in terms of luminance and chrominance (Y/C, for example, or other color coordinates) or in terms of individual color values (such as RGB). By contrast, the sub-images that are processed and output by IRE 26 are monochrome images, containing brightness information only with respect to the particular color that they represent. Each sub-image contains only a subset of the pixels that will appear in the color video output image, i.e., those pixels produced by elements of the image sensor that are covered by the corresponding color filter. In other words, in the example of the Bayer matrix shown in FIG. 1, the R and B sub-images will each contain one fourth of the pixels in the output image, while the G sub-image will contain the remaining half.

An important function of ISP 28 is to reduce the image noise, while maintaining clear edges in the image signals. (Because human perception of image quality is more sensitive to chromatic noise than to luminance noise, it is desirable to perform noise reduction after converting the image to luminance/chrominance color space, rather than in the mosaic domain.) The restoration functions performed by IRE 26, however, may increase the noise in the image and may create artifacts near saturated edges (i.e., edges at the boundary between a non-saturated image and a saturated object in the image, where some of the original image information is lost). Operation of the IRE may therefore degrade the performance of noise filtering and other functions performed by the ISP. For example, the increased amplitude of high-frequency noise and changes in the noise spectral distribution due to the restoration may impair the capability of the ISP to detect and preserve actual edges in the image while applying low-pass filtering to reduce the noise.

As another example, some ISPs use local gradients of the mosaic images in order to optimize the noise-resolution tradeoff at the stage of converting the mosaic sub-images into a combined color image. The local gradient information may be degraded by the image restoration operation of IRE 26, and image noise may be increased. Other ISP functions that may be enhanced using edge information or other auxiliary information extracted before the restoration operation include advanced white-balancing and auto-exposure control mechanisms, inter alia.

In embodiments of the present invention, to overcome these difficulties and enhance the quality of the output image, IRE 26 provides to ISP 28 (in addition to the restored sub-images) certain auxiliary information, such as edge locations, from the pre-restoration sub-images. This auxiliary information may comprise, for example:

- The pre-restoration sub-image pixel values, or differences between pre- and post-restoration pixel values.
- Edge information derived from the pre-restoration sub-images. This information may be in the form of a single bit per pixel or per area, indicating whether or not the pixel or area is classified as an edge location, or an "edge magnitude" that can have a larger range of values.
- Intensity gradient information regarding the pre-restoration sub-images, such as derivatives along certain directions (horizontal, vertical and possibly diagonals). The derivatives may be quantized based on a certain threshold or threshold values.
- Translation vectors giving correspondence of edges in the pre-restored sub-images to the restored sub-images. (These vectors may be used to compensate for shifting of the image that may occur during the restoration process, as a result of correcting for certain aberrations, for example.)
- Identification of "bad" pixels in the original sensor image.
- A noise parameter generated by a local estimator of noise level in the pre-restoration sub-images.

ISP 28 uses this auxiliary information in order to improve the quality of image processing steps that it performs, such as converting the mosaic sub-images into a combined color image and subsequent noise removal. A detailed example is presented below in FIGS. 3 and 4.

Additionally or alternatively, ISP 28 may pass auxiliary information to IRE 26. For example, the ISP may convey to the IRE thresholds for pre-restoration edge detection. As another example, the ISP may select the restoration filter kernel to be applied by IRE 26 in each area of the sub-images (or even at each pixel) according to the outcome of certain ISP functions, such as exposure control, color balance, or other statistical information, which the ISP may gather from a single image or from several consecutive images. Careful control of the IRE processing parameters in this manner can improve the quality of the output image from the ISP still further.

Typically, IRE 26 and ISP 28 are embodied in one or more integrated circuit chips, which may comprise either custom or semi-custom components. Although IRE 26 and ISP 28 are shown as separate functional blocks in FIG. 1, the functions of the IRE and the ISP may be implemented in a single integrated circuit component. Optionally, image sensor 24 may be combined with IRE 26 and possibly also ISP 28 on the same semiconductor substrate in a system-on-chip (SoC) or camera-on-chip design. Alternatively, some or all of the functions of IRE 26 and ISP 28 may be implemented in software on a programmable processor, such as a digital signal processor. This software may be downloaded to the processor in electronic form, or it may alternatively be provided on tangible media, such as optical, magnetic or electronic memory media.

Figure 2:
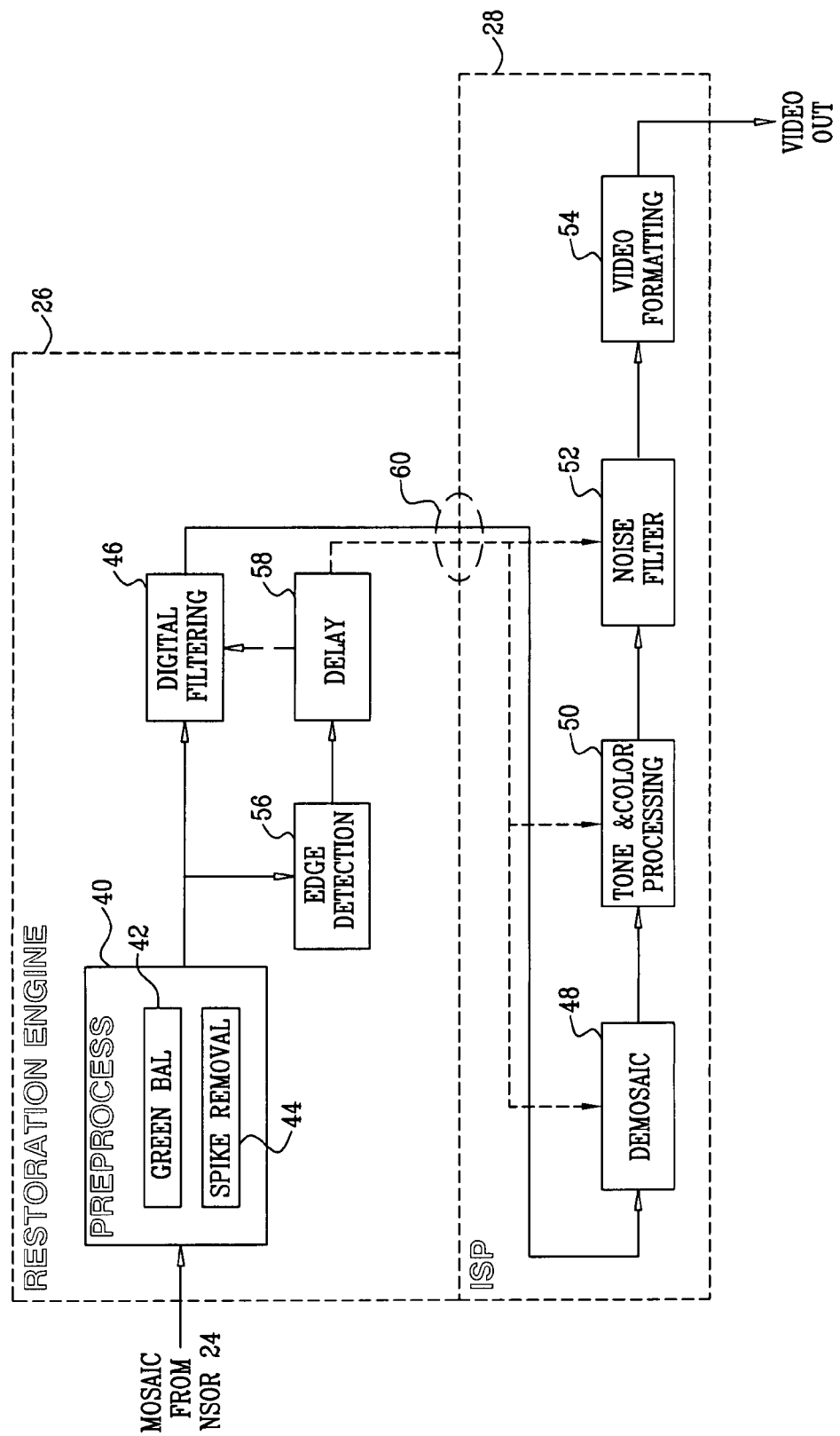
FIG. 2 is a block diagram that schematically shows details of image processing circuits in an electronic imaging camera, in accordance with an embodiment of the present invention.

FIG. 2 is a block diagram that schematically shows functional components of IRE 26 and ISP 28, in accordance with an embodiment of the present invention. In this exemplary embodiment, IRE 26 performs image restoration by deconvolution filtering (DCF) to reduce blur of the sub-images before they are combined by ISP 28 into a single color output image. Alternatively or additionally, IRE 26 may be configured to carry out other digital filtering functions in the space of the mosaic sub-images. A more detailed description of these and other functions of IRE 26 may be found in PCT patent application PCT/IL2006/001294, filed Nov. 7, 2006, which is assigned to the assignee of the present patent application and whose disclosure is incorporated herein by reference. In addition, the IRE extracts auxiliary information—specifically, edge information—from the mosaic sub-images and passes this information to ISP 28.

A preprocessing circuit 40 in IRE 26 receives the mosaic sub-images from image sensor 24 and performs preliminary processing functions prior to image restoration. In this example, the preprocessing circuit comprises a green balance unit 40 and a spike removal unit 44. The green balance unit balances the Green-red (Gr) and Green-blue (Gb) pixel values for possible amplitude variations. (Gr and Gb refer to the green pixels that occur in the RGRGRG . . . rows and GBGBGB . . . rows, respectively.) The spike removal unit identifies and modifies the values of faulty pixels, in order to prevent propagation of noise from these pixels into the processed image.

A digital filter 46 performs a deblurring operation on each of the sub-images individually. Filter 46 typically uses a deconvolution kernel that is roughly inverse to the point spread function (PSF) of optics 22 (FIG. 1), in order to "undo" the effects of the aberrations of the optics. Methods for computing kernels of this sort are described, for example, in PCT patent publication WO 2004/063989 A2, as well as in U.S. patent application Ser. No. 11/278,255, filed Mar. 31, 2006, which is assigned to the assignee of the present patent application. The disclosures of both of these patent applications are incorporated herein by reference. Alternatively, other sorts of filter kernels may be applied by filter 46, whether for deblurring or for other image processing functions that are known in the art. For example, filter 46 may perform image enhancement functions such as noise suppression and/or edge enhancement (in addition to noise suppression and edge enhancement functions performed by ISP 28). The kernels of filter 46 are typically masked so that each of the sub-images is filtered independently of the other sub-images, notwithstanding the interleaving of the sub-images in the input pixel stream.

After processing by filter 46, IRE 26 outputs the enhanced sub-images to ISP 28 via a transfer bus 60, which may use either a parallel or serial data transfer format.

An edge detection unit 56 determines the locations of edge pixels in each sub-image. This unit may similarly have the form of a digital filter with a suitable gradient kernel, such as the kernel shown in FIG. 4. The gradients computed by the filter may be compared to certain threshold values, which may be set adaptively, in order to determine edge locations. A morphological widening operation may be applied to the edge locations to generate an edge mask containing the edge regions. The mask, for example, may have the value "1" at pixels in the edge regions and "0" elsewhere. These sorts of edge identification functions are described in detail in the above-mentioned PCT patent application PCT/IL2006/001294.

Although edge detection unit 56 is shown in FIG. 2 as being a part of IRE 26, the functions of this unit may alternatively be carried out in ISP 28, based on sub-image pixel values provided by IRE 26 before application of filter 46. (Of course, when the IRE and ISP are integrated on a single chip, the question of whether the edge detection unit belongs to the IRE or to the ISP has little or no practical significance.) Optionally, the edge information may also be used by filter 46, and by a demosaic processor 48 in ISP 28.

The edge information (or other auxiliary information) may be transferred separately from or together with the output sub-image pixel values. To maintain proper synchronization between the edge information and the filtered image pixels, the edge information may pass through a delay line 58 before being conveyed to ISP 28 via bus 60. Alternatively, in software-based implementations of IRE 26, the edge information may be conveyed to ISP 28 in a separate image buffer, for example, or combined with the pixel values of the sub-images in the restored image buffer.

Alternatively, camera 20 may comprise an independent edge processing unit (not shown) in parallel to IRE 26, and ISP 28 may then receive the edge or other auxiliary information from this independent unit. This approach, however, will typically require the use of a much larger memory than delay line 58 in order to synchronize the data that are provided to ISP 28. Therefore, it is generally more economical to extract the auxiliary information for transmission over bus 60 within IRE 26, or at least to use the same memory both for the restoration functions of IRE 26 and for providing synchronized auxiliary information to ISP 28.

In some embodiments, the edge information is combined pixel-by-pixel on bus 60 with the output image pixel values by adding one or more auxiliary bits to the pixel values. For example, a 1-bit or 2-bit edge mask can be combined with a 10-bit image to convey an 11-bit or 12-bit modified image over a serial bus, in which each pixel value is modified to include an edge value. The original pixel values and the edge values are then separated out at the ISP by a serial-to-parallel decoder (not shown in the figures). The edge information may be inserted by IRE 26 in the least significant bit (LSB) or bits of each pixel value in the modified image on the bus, so that the added bits will be below the noise if the IRE is used with an ISP that is not configured to extract and process the extra edge information. As another example, 4-bit directional edge information may be combined with 8-bit compressed image data to form a 12-bit modified image on bus 60. (This sort of information transfer scheme may be designed to comply with the Standard Mobile Imaging Architecture (SMIA) interface specification for digital camera modules.) A serial-to-parallel decoder in the ISP can then separate out the 4-bit directional edge information and decompress the 8-bit image data for use in subsequent processing.

ISP 28 comprises a demosaic processor 48, which interpolates the mosaic sub-image pixel values to compute R, G and B color values for each pixel. The demosaic processor may use the edge information provided by edge detection unit 56 as part of the demosaic operation, for improved quality. A tone and color processing unit 50 adjusts the image luminance histogram and color balance and outputs pixel values in luminance/chrominance coordinates (such as YUV). These demosaic, tone and color processing functions are well known in the art. A dynamic noise filter 52 is then applied to reduce noise in the combined image, based on the edge information provided by edge detection unit 56. The operation of filter 52 is described hereinbelow with reference to FIG. 3. Following the noise filtering, a video formatting circuit 54 outputs color images in standard video format.

Figure 3:
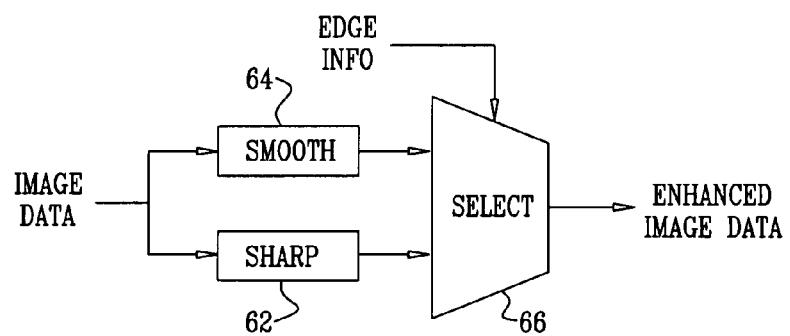
FIG. 3 is a block diagram that schematically shows details of a noise filter, in accordance with an embodiment of the present invention.

FIG. 3 is a block diagram that schematically shows details of noise filter 52, in accordance with an embodiment of the present invention. Image data from tone and color processing unit 50 is received in both a sharp processing channel 62 and a smooth processing channel 64. The smooth processing channel typically performs a low-pass digital filtering operation on the image, which averages each pixel with its neighbors. The sharp processing channel typically performs an edge enhancement filtering operation, to sharpen the edges in the pixel. Alternatively, only one of the sharp and smooth processing channels may actually filter the image, while the other channel simply passes image data through with a suitable synchronization delay.

For each pixel or area in the image, a selector 66 chooses the pixel value output of either channel 62 or channel 64, depending on the edge information received from edge detection unit 56. The selector multiplexes the chosen smooth and sharp pixel values into a combined, noise-filtered or sharpened output image. For example, assuming the edge information to comprise a 1-bit edge mask, selector 66 chooses the sharp value in edge areas and the smooth value elsewhere. Consequently, spurious "edges" due to noise in smooth areas of the image are suppressed, while real edges are preserved or even enhanced.

Alternatively, noise filter 52 may use more complex filtering and edge enhancement schemes. For example, if the edge information from unit 56 includes gradient directions, sharp processing channel 62 may choose an appropriate filter kernel to use for edge sharpening for each pixel or area depending on the local edge direction. Other adaptive noise suppression and edge enhancement schemes that may be implemented using edge information from unit 56 will be apparent to those skilled in the art and are considered to be within the scope of the present invention.

Figure 4:
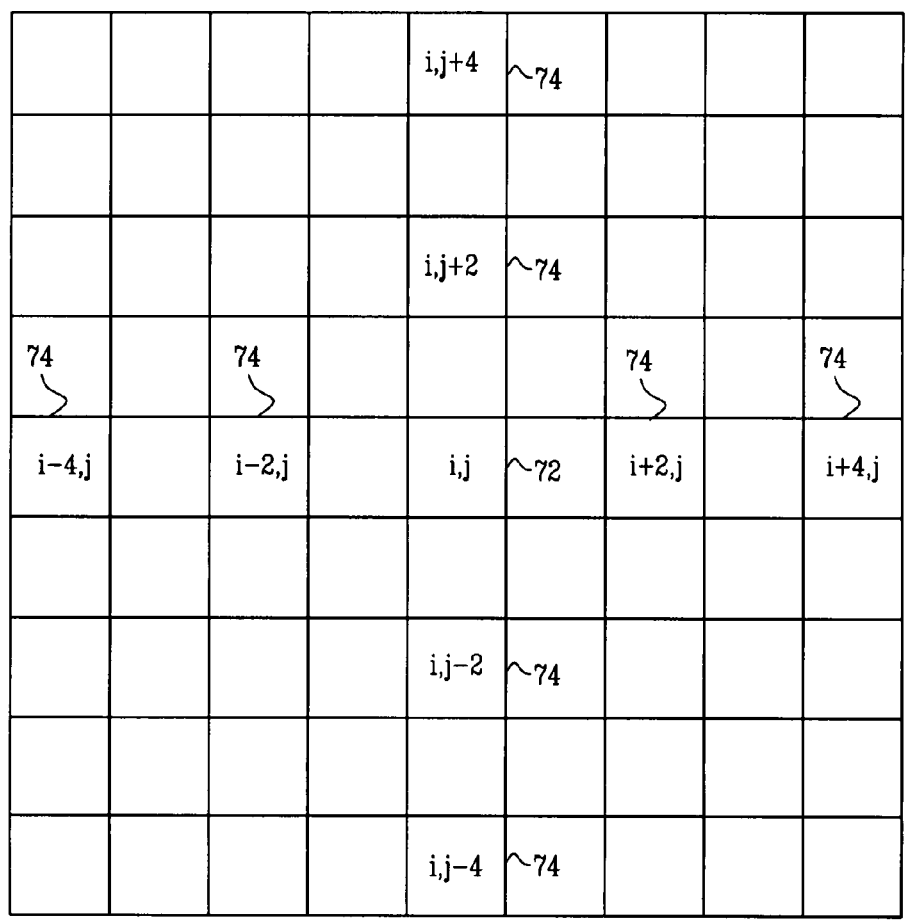
FIG. 4 is a diagram that schematically illustrates a selection of pixel values used in edge detection, in accordance with an embodiment of the present invention.

FIG. 4 is a diagram that schematically illustrates a selection of pixels 70 used by edge detection unit 56 in detecting edges in the mosaic sub-images, in accordance with an embodiment of the present invention. For each pixel 72, with coordinates (i,j), the edge detection unit uses pixels 74 that are vertically and horizontally aligned with pixel 72 in determining the value of the 1-bit edge mask e(i,j). The edge detection unit uses only alternating pixels 74, which belong to the same sub-image (i.e., the same color) as pixel 72 in the mosaic image space. The inventors have found that the edge detector represented by FIG. 4 gives an effective compromise between high resolution and good step detection with minimal false edge detection and reasonable use of computational resources. Alternatively, substantially any other suitable selection of pixels and edge detection algorithm may be used by edge detection unit 56, as will be apparent to those skilled in the art.

To determine the edge mask values, edge detection unit 56 computes a set of gradient values for each pixel, given by:

$$d_{x-1}=p(i-2,j)-p(i,j) \quad g_{x-1}=p(i-4,j)-p(i-2,j)$$

$$d_{x+1}=p(i+2,j)-p(i,j) \quad g_{x+1}=p(i+4,j)-p(i+2,j)$$

$$d_{y-1}=p(i,j-2)-p(i,j) \quad g_{y-1}=p(i,j-4)-p(i,j-2)$$

$$d_{y+1}=p(i,j+2)-p(i,j) \quad g_{y+1}=p(i,j+4)-p(i,j+2)$$

The edge value e(i,j) output by the edge detection unit is set to 1 (indicating presence of an edge) if any of the following four expressions evaluates to TRUE:

$$\begin{cases} (|d_{x-1}| > \text{Edge\_threshold\_value}) \text{ and } (|d_{x-1}| > |g_{x-1}| \text{ or } d_{x-1} \cdot g_{x-1} \leq 0) \\ (|d_{x+1}| > \text{Edge\_threshold\_value}) \text{ and } (|d_{x+1}| > |g_{x+1}| \text{ or } d_{x+1} \cdot g_{x+1} \leq 0) \\ (|d_{y-1}| > \text{Edge\_threshold\_value}) \text{ and } (|d_{y-1}| > |g_{y-1}| \text{ or } d_{y-1} \cdot g_{y-1} \leq 0) \\ (|d_{y+1}| > \text{Edge\_threshold\_value}) \text{ and } (|d_{y+1}| > |g_{y+1}| \text{ or } d_{y+1} \cdot g_{y+1} \leq 0) \end{cases}$$

As noted earlier, edge detection unit 56 may optionally apply a morphological widening operation to the locus e(i,j)=1.

In experiments on actual images, the inventors discovered that although similar numbers of true edge pixels could be found whether edge detection was performed before or after digital filter 46, edge detection before digital filtering gave a much smaller number of false edges (i.e., pixels at which e(i,j)=1, despite the pixels being located in an area of the image that a human observer classified as non-edge). Thus, using the mask derived by pre-filter edge detection resulted in a smoother, less-noisy output image from the ISP, without compromising the sharpness of the true edges. Alternatively, the threshold used for edge detection prior to digital filter 46 could be set to a lower value, in order to detect a larger number of true edges (at the expense of moderate added false edge detection) and thus give an output image from the ISP with enhanced fine detail.

Although the embodiments described hereinabove relate to the specific processing architecture of camera 20, the principles of the present invention, whereby features of mosaic sub-images, such as edge characteristics, are used in controlling processing of post-mosaic combined images (possibly using shared memory resources for restoration and auxiliary information), and vice versa, may similarly be applied in architectures of other types. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
a mosaic image sensor, which is configured to generate a stream of input pixel values belonging to a plurality of input sub-images, each input sub-image corresponding to light of a respective color that is incident on the mosaic image sensor;
an image restoration engine (IRE), which is coupled to receive and digitally filter the input pixel values in each of the input sub-images so as to generate a corresponding plurality of enhanced output sub-images, and to extract auxiliary information from the input sub-images prior to digitally filtering the input pixel values; and
an image signal processor (ISP), which is coupled to receive the plurality of enhanced output sub-images and the auxiliary information from the IRE, and to process the enhanced output sub-images in order to generate a color video output image while enhancing the color video output image using the auxiliary information.

2. The apparatus according to claim 1, wherein the IRE comprises a deconvolution filter for reducing a blur of the input sub-images.

3. The apparatus according to claim 1, wherein the mosaic image sensor comprises an array of filters that are arranged in a Bayer mosaic pattern.

4. The apparatus according to claim 1, wherein the auxiliary information comprises edge information.

5. The apparatus according to claim 4, wherein the edge information comprises an edge mask identifying edge regions in the input sub-images.

6. The apparatus according to claim 4, wherein the edge information comprises at least one edge characteristic that is determined respectively for each of a plurality of pixels in the input sub-images, wherein the at least one edge characteristic is selected from a group of characteristics consisting of an edge magnitude and an edge direction.

7. The apparatus according to claim 4, wherein the ISP is configured to enhance the color video output image by performing at least one image enhancement operation responsively to the edge information, wherein the at least one image enhancement operation is selected from a group of operations consisting of noise suppression and edge enhancement.

8. The apparatus according to claim 1, wherein the auxiliary information comprises at least one item of information selected from a group of items consisting of an identification of bad pixels and a local noise parameter.

9. The apparatus according to claim 1, wherein the auxiliary information comprises at least one type of pixel value data selected from a group of types of pixel value data consisting of the input pixel values, and differences between the input pixel values and output pixel values of the enhanced output sub-images.

10. The apparatus according to claim 1, wherein the enhanced output sub-images comprise output pixel values, and wherein the IRE is configured to convey the auxiliary information to the ISP by adding one or more auxiliary bits to the output pixel values.

11. The apparatus according to claim 10, wherein the IRE is configured to convey the output pixel values and the one or more auxiliary bits to the ISP via a serial data bus.

12. The apparatus according to claim 10, wherein the IRE is configured to convey the output pixel values and the one or more auxiliary bits to the ISP via a parallel data bus.

13. The apparatus according to claim 1, wherein the ISP is configured to perform one or more image processing and control operations selected from the group of operations consisting of demosaic processing, white balancing, and auto-exposure control, and to apply the auxiliary information in performing at least one of the one or more image processing and control operations.

14. Imaging apparatus, comprising:
a mosaic image sensor, which is configured to generate a stream of input pixel values belonging to a plurality of input sub-images, each input sub-image corresponding to light of a respective color that is incident on the mosaic image sensor;
an image restoration engine (IRE), which is coupled to receive and digitally filter the input pixel values in each of the input sub-images using filter parameters determined responsively to auxiliary information, so as to generate a corresponding plurality of enhanced output sub-images; and
an image signal processor (ISP), which is coupled to receive and process the plurality of enhanced output sub-images in order to generate a color video output image, the ISP further generating the auxiliary information for input to the image restoration engine.

15. The apparatus according to claim 14, wherein the IRE is configured to detect edges in the input sub-images, and wherein the auxiliary information comprises an edge detection threshold for use in detecting the edges in the input sub-images.

16. The apparatus according to claim 14, wherein the auxiliary information comprises an indication of a filter kernel to be applied by the IRE in digitally filtering the input pixel values.

17. Imaging apparatus, comprising:
a mosaic image sensor, which is configured to generate a stream of input pixel values belonging to a plurality of sub-images, each sub-image corresponding to light of a respective color that is incident on the mosaic image sensor;

an edge detector, which is coupled to extract edge information from one or more of the sub-images; and an image signal processor (ISP), which is coupled to receive and process the plurality of sub-images in order to generate a color video output image, and to enhance the color video output image using the edge information, wherein the ISP uses the edge information to determine which noise filter of a plurality of noise filters to use to filter noise from the color video output image.

18. The apparatus according to claim 17, wherein the edge information comprises an edge mask identifying edge regions in the sub-images.

19. The apparatus according to claim 17, wherein the edge information comprises at least one edge characteristic that is determined respectively for each of a plurality of pixels in the sub-images, wherein the at least one edge characteristic is selected from a group of characteristics consisting of an edge magnitude and an edge direction.

20. The apparatus according to claim 17, wherein the ISP is configured to enhance the color video output image by performing at least one image enhancement operation responsively to the edge information, wherein the at least one image enhancement operation is selected from a group of operations consisting of noise suppression and edge enhancement.

21. The apparatus according to claim 17, wherein the edge detector is configured to extract the edge information at each pixel among a plurality of pixels in at least one sub-image by processing the input pixel values of a first group of the pixels that are horizontally aligned with the pixel and of a second group of the pixels that are vertically aligned with the pixel.

22. A method for imaging, comprising:
receiving from a mosaic image sensor a stream of input pixel values belonging to a plurality of input sub-images, each input sub-image corresponding to light of a respective color that is incident on the mosaic image sensor;
digitally filtering the input pixel values in each of the input sub-images so as to generate a corresponding plurality of enhanced output sub-images;
extracting auxiliary information from the input sub-images prior to digitally filtering the input pixel values; and
processing the enhanced output sub-images in order to generate a color video output image, while enhancing the color video output image using the auxiliary information.

23. The method according to claim 22, wherein digitally filtering the input pixel values comprises applying a deconvolution filter to reduce a blur of the input sub- images.

24. The method according to claim 22, wherein the mosaic image sensor comprises an array of filters that are arranged in a Bayer mosaic pattern.

25. The method according to claim 22, wherein the auxiliary information comprises edge information.

26. The method according to claim 25, wherein the edge information comprises an edge mask identifying edge regions in the input sub-images.

27. The method according to claim 25, wherein the edge information comprises at least one edge characteristic that is determined respectively for each of a plurality of pixels in the input sub-images, wherein the at least one edge characteristic is selected from a group of characteristics consisting of an edge magnitude and an edge direction.

28. The method according to claim 25, wherein enhancing the color video output image comprises performing at least one image enhancement operation responsively to the edge information, wherein the at least one image enhancement operation is selected from a group of operations consisting of noise suppression and edge enhancement.

29. The method according to claim 22, wherein the auxiliary information comprises at least one item of information selected from a group of items consisting of an identification of bad pixels and a local noise parameter.

30. The method according to claim 22, wherein the auxiliary information comprises at least one type of pixel value data selected from a group of types of pixel value data consisting of the input pixel values, and differences between the input pixel values and output pixel values of the enhanced output sub-images.

31. The method according to claim 22, wherein the enhanced output sub-images comprise output pixel values which are processed by an image signal processor (ISP), and wherein extracting the auxiliary information comprises conveying the auxiliary information to the ISP by adding one or more auxiliary bits to the output pixel values.

32. The method according to claim 31, wherein conveying the auxiliary information comprises conveying the output pixel values and the one or more auxiliary bits to the ISP via a serial data bus.

33. The method according to claim 31, wherein conveying the auxiliary information comprises conveying the output pixel values and the one or more auxiliary bits to the I8P via a parallel data bus.

34. The method according to claim 31, wherein processing the enhanced output sub-images and enhancing the color video output image comprise performing one or more image processing and control operations selected from the group of operations consisting of demosaic processing, white balancing, and auto-exposure control, and wherein the auxiliary information is applied in performing at least one of the one or more image processing and control operations.

35. A method for imaging, comprising:
receiving from a mosaic image sensor a stream of input pixel values belonging to a plurality of input sub-images, each input sub-image corresponding to light of a respective color that is incident on the mosaic image sensor;
digitally filtering the input pixel values in each of the input sub-images using filter parameters determined responsively to auxiliary information, so as to generate a corresponding plurality of enhanced output sub-images;
processing the enhanced output sub-images in order to generate a color video output image; and
generating the auxiliary information used in digitally filtering the input pixel values.

36. The method according to claim 35, wherein digitally filtering the input pixel values comprises detecting edges in the input sub-images, and wherein generating the auxiliary information comprises providing an edge detection threshold for use in detecting the edges in the input sub-images.

37. The method according to claim 35, wherein generating the auxiliary information comprises providing an indication of a filter kernel to be applied in digitally filtering the input pixel values.

38. A method for imaging, comprising:
receiving from a mosaic image sensor a stream of input pixel values belonging to a plurality of sub-images, each sub-image corresponding to light of a respective color that is incident on the mosaic image sensor;
extracting edge information from one or more of the sub-images;
processing the output sub-images in order to generate a color video output image; and enhancing the color video output image using the edge information, wherein the edge information is used to determine which noise filter of a plurality of noise filters to use to filter noise from the color video output image.

39. The method according to claim 38, wherein the edge information comprises an edge mask identifying edge regions in the sub-images.

40. The method according to claim 38, wherein the edge information comprises at least one edge characteristic that is determined respectively for each of a plurality of pixels in the sub-images, wherein the at least one edge characteristic is selected from a group of characteristics consisting of an edge magnitude and an edge direction.

41. The method according to claim 38, wherein enhancing the color video output image comprises performing at least one image enhancement operation responsively to the edge information, wherein the at least one image enhancement operation is selected from a group of operations consisting of noise suppression and edge enhancement.

42. The method according to claim 38, wherein extracting the edge information comprises, at each pixel among a plurality of pixels in at least one sub-image, processing the input pixel values of a first group of the pixels that are horizontally aligned with the pixel and of a second group of the pixels that are vertically aligned with the pixel.

43. A computer software product, comprising a computer-readable medium in which program instructions are stored, which instructions, when read by the computer, cause the computer to receive, from a mosaic image sensor, a stream of input pixel values belonging to a plurality of sub-images, each sub-image corresponding to light of a respective color that is incident on the mosaic image sensor, to extract edge information from one or more of the sub-images, to process the plurality of the sub-images in order to generate a color video output image, and to enhance the color video output image using the edge information, wherein the edge information is used to determine which noise filter of a plurality of noise filters to use to filter noise from the color video output image.

44. A computer software product, comprising a computer-readable medium in which program instructions are stored, which instructions, when read by the computer, cause the computer to receive, from a mosaic image sensor, a stream of input pixel values belonging to a plurality of input sub-images, each input sub-image corresponding to light of a respective color that is incident on the mosaic image sensor, to digitally filter the input pixel values in each of the input sub-images so as to generate a corresponding plurality of enhanced output sub-images, to extract auxiliary information from the input sub-images prior to digitally filtering the input pixel values, and to process the enhanced output sub-images in order to generate a color video output image while enhancing the color video output image using the auxiliary information.

45. The apparatus of claim 17, wherein the edge information is incorporated into the input pixel values belonging to the plurality of sub-images.

46. The method of claim 38, further comprising:
incorporating the edge information into the input pixel values belonging to the plurality of sub-images.

47. The computer software product of claim 43, wherein the instructions further cause the computer to incorporate the edge information into the input pixel values belonging to the plurality of sub-images.

\* \* \* \* \*